US006881452B2

United States Patent
Spitsberg

(10) Patent No.: US 6,881,452 B2
(45) Date of Patent: Apr. 19, 2005

(54) METHOD FOR IMPROVING THE TBC LIFE OF A SINGLE PHASE PLATINUM ALUMINIDE BOND COAT BY PREOXIDATION HEAT TREATMENT

(75) Inventor: Irene Spitsberg, Loveland, OH (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 09/900,546

(22) Filed: Jul. 6, 2001

(65) Prior Publication Data

US 2003/0203221 A1 Oct. 30, 2003

(51) Int. Cl.[7] .............................................. C23C 14/30
(52) U.S. Cl. ...................... 427/596; 427/252; 427/253; 427/255.19; 427/327; 148/276; 148/277; 148/284; 148/285; 205/149; 205/228; 205/264
(58) Field of Search ................................. 421/596, 252, 421/253, 255.19, 327; 148/276, 277, 284, 285; 205/149, 228, 264

(56) References Cited

U.S. PATENT DOCUMENTS

| | | | |
|---|---|---|---|
| 4,414,249 A | 11/1983 | Ulion et al. | 427/248.1 |
| 5,238,752 A | 8/1993 | Duderstadt et al. | 428/623 |
| 5,624,731 A | 4/1997 | Desjardins | 428/143 |
| 5,658,614 A * | 8/1997 | Basta et al. | 427/253 |
| 5,716,720 A * | 2/1998 | Murphy | 428/623 |
| 5,763,107 A | 6/1998 | Rickerby et al. | 428/623 |
| 5,817,372 A | 10/1998 | Zheng | 427/456 |
| 5,846,605 A | 12/1998 | Rickerby et al. | 427/255 |
| 5,856,027 A | 1/1999 | Murphy | 428/623 |
| 5,866,271 A | 2/1999 | Stueber et al. | 428/545 |
| 5,975,852 A | 11/1999 | Nagaraj et al. | 416/241 |
| 5,993,980 A | 11/1999 | Schmitz et al. | 428/633 |
| 6,020,075 A | 2/2000 | Gupta et al. | 428/612 |
| 6,472,018 B1 * | 10/2002 | Warnes et al. | 427/250 |
| 6,495,271 B1 * | 12/2002 | Vakil | 428/632 |
| 6,565,672 B1 * | 5/2003 | Spitzberg et al. | 148/277 |
| 6,576,067 B1 * | 6/2003 | Spitzberg et al. | 148/277 |

FOREIGN PATENT DOCUMENTS

EP 969117 A2 * 1/2000 ........... C23C/14/08

* cited by examiner

*Primary Examiner*—Timothy Meeks
(74) *Attorney, Agent, or Firm*—Carmen Santa Maria; McNees Wallace & Nurick LLC

(57) ABSTRACT

A thermal barrier coating system having an improved life as a result of a preoxidation treatment applied to a single phase platinum aluminide bond coat. After coating the substrate to form a diffusion platinum aluminum bond coat, the surface finish of the bond coat was grit blasted with an inert grit of preselected size at a preselected pressure to achieve a predetermined surface finish. After the grit blasting, but before application of the ceramic top coat of yttria-stabilized zirconia (YSZ), the coating was preoxidized to form a thin alumina scale by heat treating the diffusion platinum aluminide bond coat at an elevated temperature at a preselected partial pressure of oxygen.

18 Claims, 4 Drawing Sheets

METHOD FOR IMPROVING THE TBC LIFE OF A SINGLE PHASE PLATINUM ALUMINIDE BOND COAT BY PREOXIDATION HEAT TREATMENT

FIELD OF THE INVENTION

The present invention is directed to improving the life of a thermal barrier coating system used in hot environments, and more specifically, to improving the life of a thermal barrier coating system used in turbine applications by proper pretreatment of the bond coat prior to application of the ceramic topcoat.

BACKGROUND OF THE INVENTION

Improvements in manufacturing technology and materials are the keys to increased performance and reduced costs for many articles. As an example, continuing and often interrelated improvements in processes and materials have resulted in major increases in the performance of aircraft gas turbine engines. Many of the improvements in gas turbine engines has been in extending the life expectancy of the turbine components that are subjected to cyclic stresses at high temperatures in corrosive, oxidative environments. Extending the life expectancy increases the mean service life of the components before replacement or repair. This is a benefit to the operator of the aircraft that uses the gas turbine engines, as less "down time" for repairs or replacements is experienced, resulting in an increase in operational time for revenues service.

Many of the parts used in the hot section of the turbine engine, such as turbine airfoils, are coated with thermal barrier coating systems. These systems are subject deterioration as a result of the extreme service conditions in a hostile environment. Constant improvements are sought in the life expectancy of thermal barrier coating systems to improve the performance of the engine. These thermal barrier coating systems include high temperature superalloys that are coated with high temperature ceramic materials to improve their temperature capability. In order to improve the adhesion of the ceramic material applied as a coating to the substrate, a bond coat is placed between the substrate and the ceramic top coating. Various bond coats have been used including MCrAlY's and diffusion aluminides.

Preoxidation of MCrAlY bond coats prior to application of a thermal barrier layer to form a thin alumina layer by in-situ oxidation of the MCrAlY layer using a commercially pure hydrogen atmosphere at 1975° F. has been found to improve the adhesion of the ceramic layer as set forth in U.S. Pat. No. 4,414,249 to Ulion et al. The preoxidation is preceded by polishing of the MCrAlY. While the polishing step was important, the technique was not felt to be important and could be accomplished mechanically electrochemically or chemically.

U.S. Pat. No. 5,238,752 to Duderstat et al. teaches the formation of a thin coating of alumina over a diffusion aluminide coating during the heating step which is part of the deposition process for the ceramic coating. Heating to a temperature of about 1800° F. is accomplished in a vacuum chamber in an atmosphere of about $5\times10^{-5}$ Torr to produce a coating thickness of about $2\times10^{-5}$ inches.

Others have discussed similar formation of a protective alumina coating by using a low partial pressure oxygen atmosphere during thermal treatment. Exemplary teachings include U.S. Pat. No. 5,716,720 to Murphy, which teaches formation of the alumina layer by evacuating a vacuum furnace to $10^{-6}$ Torrs before backfilling the furnace with Ar during a heat treatment of 1975° F. Rickerby et al. in U.S. Pat. No. 5,763,107 teaches the formation of the alumina layer during the formation of the ceramic coating after evacuation at a pressure of about $10^{-5}$ Torr, the dissociation of the ceramic during the EB application of the zirconia contributing to the oxidation of the bond coat. Rickerby et al. also teaches the optional intentional addition of oxygen during application of the ceramic top coat.

Myriad other teachings of formation of an alumina over a bond coat, whether a MCrAlY or a diffusion aluminide or a superalloy substrate exist. Even when protective atmospheres are formed, the formation of an alumina layer thus appears to be incidental to subsequent high temperature exposure of an outer layer that contains a perceivable quantity of aluminum, which is a fundamental part of the composition of MCrAlY diffusion aluminides and superalloy substrates. These general approaches describe the formation of a "pure" alumina by CVD deposition or its thermal growth under carefully controlled atmospheres to achieve oxide thicknesses of 0.25–25 microns.

These teachings indicate that there are a number of considerations in the formation of oxide over the layer underlying the ceramic top coat. Among these considerations is the completion of oxide phase transformation from transient oxides to a dense alpha alumina. Also to be considered is the purity of the oxide formed. The kinetics of the transition from internal to external oxidation as well as the formation of a "defect free" contiguous layer may also contribute to the success of oxide formation in a particular system. Other system-specific factors may include the columnar oxide grain structures and oxide growth by inward diffusion with no lateral oxide growth.

Despite the large number of teachings of the benefit of the formation of an alumina layer over a bond coat prior to the application of a ceramic top coat, and the perceived novelty of forming such alumina layers using various processing techniques, the formation of an alumina layer is incidental to subsequent high temperature exposure of an outer layer that includes some aluminum. It is clear, however, that there are other factors that contribute to the inevitable and incidental formation of alumina at elevated temperatures, and that the complexity of the formation of this alumina in varying and different compositions is not, and has not been, well understood. To achieve a "good" alumina coating, the complexity of the process of oxide film formation must be taken into consideration, along with other seldom discussed and interrelated factors such as the chemical composition of the surface that will underlie the ceramic top coat, whether substrate material or a subsequently applied bond coat, coating microstructure as well as surface conditions. The formation of acceptable alumina is very specific to the coating system and the interrelationship of these factors.

What is needed are advanced coatings in which these various interrelated factors are understood so that coating systems can yield longer life expectancies or higher temperature capabilities.

SUMMARY OF THE INVENTION

The present invention provides a thermal barrier coating system having an improved life as a result of a preoxidation treatment applied to a bond coat. After coating the substrate with platinum and forming a diffusion platinum aluminum bond coat, the surface finish of the bond coat was grit blasted with an inert grit of preselected size at a preselected pressure to achieve a predetermined surface finish. After the grit blasting, but before application of the ceramic top coat of yttria-stabilized zirconia (YSZ), the coating was preoxidized to form a thin alumina scale by heat treating the diffusion platinum aluminide bond coat at a preselected elevated temperature at a preselected partial pressure of oxygen.

Additionally the preoxidation heat treatment of the bond coating is performed at a specified rate, no slower than about 45 minutes to span the temperature range from ambient or near ambient to at least about 1090° C. (2000° F.). Application of the ceramic top coat over the platinum aluminide bond coat having a thermally grown oxide film is performed at a temperature of no lower than about 850° C. (1560° F.) using a physical vapor deposition method.

While the processes and treatments set forth herein generally are applicable to the diffusion platinum aluminides of thermal barrier coating system of the present invention, it is recognized that these parameters may well be ineffective in other thermal barrier systems in producing the pure alumina bond coat required to improve the FTC life, and hence the performance of a different thermal barrier system may not achieve the same beneficial results using these parameters. Indeed, a different thermal barrier system could conceivably be degraded by similar parameters.

As used herein, the term "platinum aluminide," (PtAl), encompasses unmodified platinum aluminide and modified platinum aluminides, provided however that the basic single phase structure of the aluminide is maintained. When applied over nickel-based superalloy substrates, these "platinum aluminides" form single phase platinum-nickel aluminides, PtNiAl, and this structure is also encompassed within the term platinum aluminide. The term "aluminum oxide" (alumina) as used herein encompasses unmodified aluminum oxide as well as modified forms of aluminum oxide containing small amounts of additional elements such as nickel, cobalt, chromium or other elements. Elements such as nickel and chromium may then form other oxides such as chromium oxide or nickel oxide. These elements may be present in the oxide as a result of diffusion from the substrate or as modifiers intentionally added to the bond coat. The term "pure alumina oxide" does not include chromium oxides or nickel oxides. The terms "partial pressure of oxygen" or "oxygen partial pressure" are used interchangeably and mean either a partial pressure of pure oxygen intentionally flowing through the furnace as measured by an oxygen gage, or by premixing oxygen with an inert gas, such as argon, in known, ascertainable ratios and flowing the mixture through the furnace. These partial pressures of oxygen are controlled within the prescribed limits.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
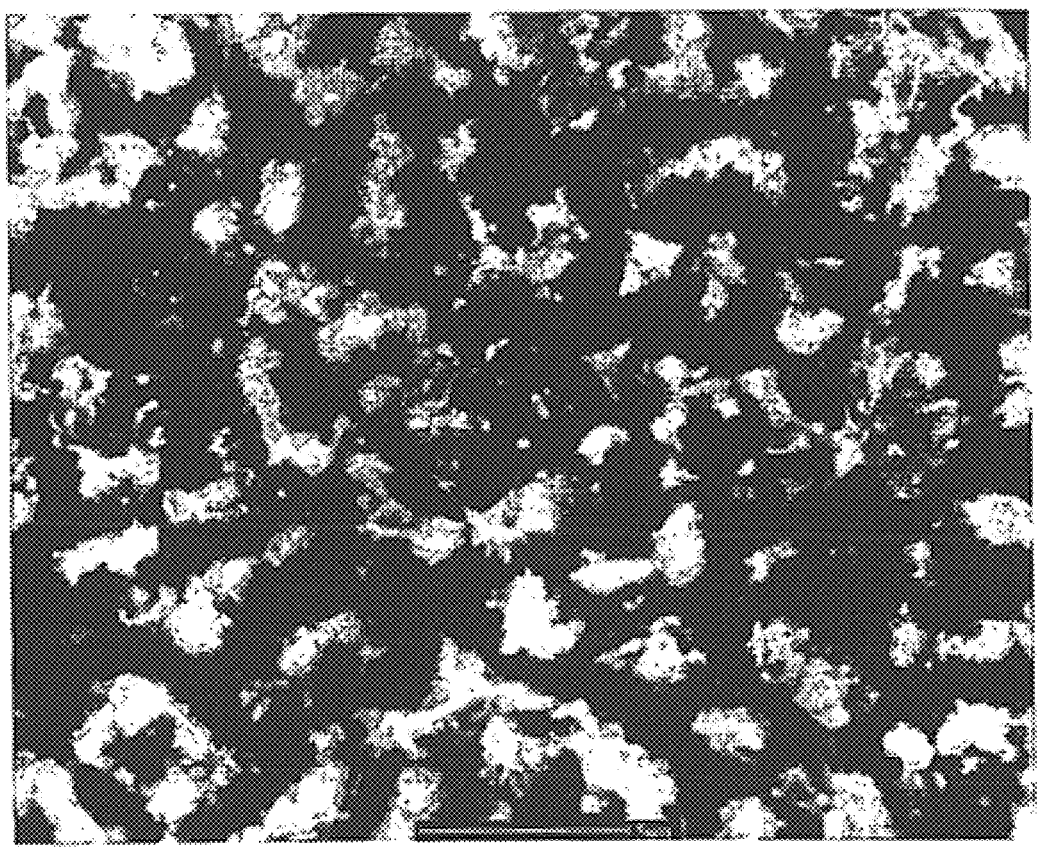
FIG. 1 is a SEM cross-sectional view of internal oxidation and whiskers indicating outward diffusion of aluminum in the alumina layer formed in a two-phase PtAl coating preoxidized at $10^{-5}$ mbar.

The present invention is generally applicable to components formed from superalloys used in the hot portions of turbine engines to which thermal barrier coating systems are applied to improve their temperature capability. Such components are subjected to very high temperatures as well as severe oxidation and corrosion, thermal stresses and thermal cycling. These components most typically include high and low pressure turbine airfoils, such as turbine blades and turbine vanes. Other applicable components include shrouds, combustor liners and augmentor hardware.

The superalloy hardware of the present invention is coated with a single phase platinum aluminide bond coat. The type of superalloy is not a critical factor in the present invention, and an additional coating such as a diffusion barrier may even be imposed between the superalloy substrate and the bond coat if desired, so as to minimize the effect of elemental diffusion between the superalloy substrate and the bond coat. In preferred embodiments, the superalloy substrate materials are nickel-based superalloys, and in the most preferred embodiments, the nickel-based superalloy substrate material is René N5.

The bond coat of the present invention is a single phase platinum aluminide bond coat. While there are several ways of achieving a platinum aluminide bond coat, the preferred method of forming the bond coat is to deposit a layer of platinum over the substrate article. This can be performed by a chemical vapor deposition method (CVD), but is preferably applied by an electro-deposition technique such as electroplating. The aluminide may be developed in accordance with a number of well known techniques, which include exposing the platinum coated surface to a vapor phase aluminum. Once again, this may involve CVD, or the well-known pack processed or over-the-pack processes. As these are elevated temperature processes, the full development of the platinum aluminide may require some additional time at an elevated temperature, as is well known in the art.

Following formation of the single phase diffusion platinum aluminide, the diffusion platinum aluminide coating is provided with a surface finish between about 16 $R_a$ and 125 $R_a$. Preferably, the coating is grit blasted using alumina grit having a grit classification from #60 to #1200. The preferred grit size is #80. The pressure utilized in the grit blasting procedure is performed at between 30–100 psi, but preferably between about 60–80 psi. The grit blasting produces an average surface finish of between about 32 $R_a$ and 63 $R_a$, preferably about 50 $R_a$. As will be discussed below, a chemical treatment of the platinum aluminide of the coating of the present invention did not produce the beneficial results obtained with the grit-blasting techniques required by the present invention. Grit blasting of the single phase diffusion platinum aluminide coating is an essential element in the success of the thermal barrier coating of the present invention. It is believed that grit blasting achieves a uniform and "clean surface chemistry." Grit blasting removes up to 2 microns of material from the surface. All surface contaminants are removed, as well as localized surface concentration gradients of Pt, Al and Ni.

Following the treatment of the surface finish of the single phase diffusion platinum aluminide bond coat, the article is given a preoxidation heat treatment. The parameters of the preoxidation heat treatment are carefully controlled to produce the desired thin, pure alumina film of the present invention. The fundamental parameters include the partial pressure of oxygen, the heating rate and the temperature range of the preoxidation heat treatment. To form the desired oxide, a partial pressure of no lower than $10^{-5}$ mbar of oxygen is required. However, the maximum partial pressure of oxygen is about 1000 Mbar. When the platinum aluminide bond coat is preoxidized at a partial pressure of oxygen of about $10^{-4}$ mbar, a coating system having the best FCT life is produced. The rate of heating the coated article requires heating from near ambient temperature to the preoxidation temperature within about 45 minutes. Preferably, the heating is performed in a time range of about 11–15 minutes. The preoxidation is performed in the temperature range of 982° C.–1150° C. (1800° F–2100° F.), and preferably at about 1121° C. (2050° F.).

It is an important aspect of the present invention to perform the preoxidation within the above parameters. Analysis of oxides formed using parameters outside these ranges yielded variations from oxides formed using these parameters. Scanning electron microscopy (SEM) and depth profiling of the formed oxides for chemical composition of the oxides by XPS techniques disclosed these variations. Non-uniform microstructures resulted when there were high oxygen pressures, that is above about 1000 Mbar. The non-uniform microstructures were exacerbated when elements other than aluminum were present in the oxide. Oxygen pressures within the range of the present invention yielded compact "ridge" type microstructures characteristic of alpha-alumina again when no elements other than aluminum were present in the oxide. Low partial pressures of oxygen, below $10^{-5}$ mbars, could result in internal oxidation along with an outward diffusion of aluminum. This structure initially became evident during preoxidation heat treatment of two phase PtAl coatings that were preoxidized at partial pressures of about $10^{-5}$ mbar, and is expected to become more prevalent as the partial pressure of oxygen is further reduced. This structure is expected to yield a poor adhesion of the oxide to the bond coat. Extensive internal oxidation with growth of oxide "whiskers" pointing to the outward diffusion of aluminum is shown in FIG. 1. While the two phase PtAl coating preoxidized at $10^{-5}$ mbars did display this extensive internal oxidation, likely because of the presence of fine grains of the second phase at the surface of the two phase PtAl coating that provides short paths for the inward diffusion of oxygen and the outward diffusion of aluminum, a single phase PtAl coating similarly preoxidized did not display this oxidation.

The rate of heating the coated article is also a factor. If the rate of heating is performed too slowly, there is an opportunity for detrimental oxide phases to form within the oxide layer at intermediate temperatures. As these other oxide layers are not as adherent as the pure alumina and since they intermix with the pure alumina forming an overall oxide layer that is not pure, the resulting oxide layer is not as adherent and will have a reduced life as it peels from the PtAl surface much more quickly than a pure alumina.

Figure 3:
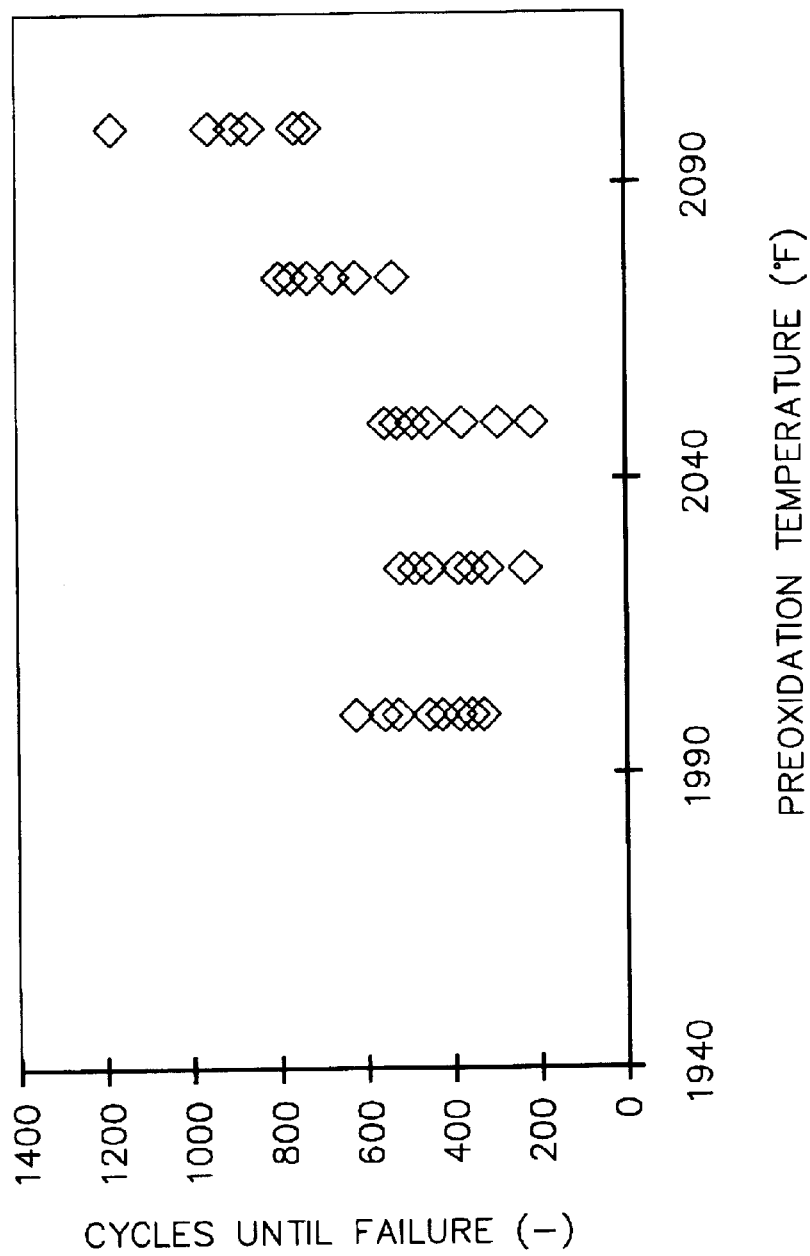
FIG. 3 is a graph showing the effect of preoxidizing temperature on the FCT life of a single phase PtAl coating.
Figure 4:
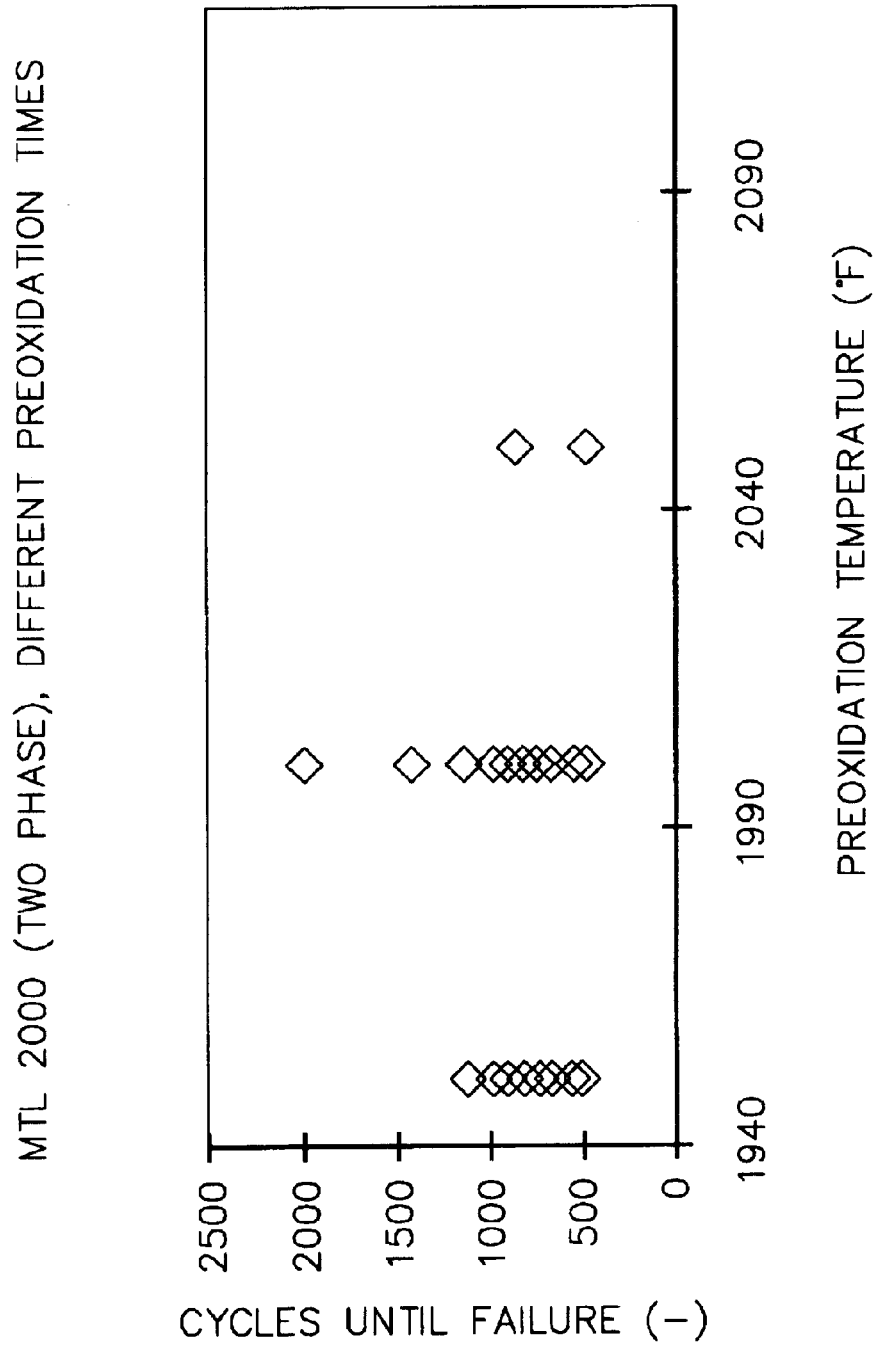
FIG. 4 is a graph showing the effect of temperature on the FCT life of a two phase PtAl coating.

While the temperature of preoxidation is important, it is specific to a particular bond coat, and therefore to a particular thermal barrier coating system. A successful preoxidation of one preselected bond coat forms an acceptable oxide at a given temperature, but a different bond coating system, while it may oxidize, does not form the best possible coating system at the same preoxidation temperature. This is best seen by reference to FIGS. 3 and 4. FIGS. 3 and 4 shows the FCT life cycle results of two different coating compositions when oxidized at various temperatures in the temperature range of about 1940–2100° F. The first coating shown in FIG. 3 withstands the highest cycles to failure when preoxidized at a temperature in the range of about 2090–2100° F. The number of cycles is reduced when the preoxidation is performed at lower temperatures. When a different second coating is given the same preoxidation treatment, different fatigue life results occur. As shown in FIG. 4, the second coating withstands the highest cycles to failure when preoxidized at a temperature of about 2000° F. The performance of the first coating at this preoxidation temperature is well below the peak values in the temperature in the range of about 2090–2100° F. The coating of FIG. 1 is a single phase Pt(Ni)Al coating that produced the data set forth in FIG. 3. The coating that produced the data set forth in FIG. 4 is a two phase Pt(Ni)Al coating, the coating having a higher aluminum content than the single phase coating, and further including precipitates of a second phase of $Pt_xAl_y$.

Once the pure alumina film or coating is formed over the PtAl bond coat, a 7-YSZ ceramic top coat is applied over it. The method of applying this ceramic top coat is well-known in the art, and any physical vapor deposition (PVD) process may be used to apply the ceramic top coat.

EXAMPLE 1

René N5 substrates were coated with a single phase PtAl bond coat and grit blasted with #60 alumina grit at 80 psi to achieve an average surface roughness of about 50 Ra. The substrates were then heat treated at an oxygen partial pressures of $10^{-6}$ mbar, $10^{-5}$ mbar, $10^{-4}$ mbar and 1000 Mbars at about 2050° F. for about 2–4 hours. Following the partial pressure oxidation, the samples were provided with a standard 7-YSZ ceramic topcoat with an electron beam physical vapor deposition (EBPVD) process. The samples were given a one hour FCT cycle test at about 2125° F. The results are provided in FIG. 2. The baseline for samples having a single phase bond coat, being grit blasted but not having a partial pressure heat treatment, is 230 cycles. The partial pressure preoxidation improves the fatigue cycle life over the baseline sample.

EXAMPLE 2

René N5 substrates were coated with a single phase PtAl bond coat and divided into two groups. The surface of the first group was grit blasted with #60 alumina grit at a pressure of 80 psi. The second group was acid etched in a solution of hydrochloric acid (HCl) and nitric acid ($HNO_3$) for a time of about ten (10) seconds at room temperature. The cleanliness of the surfaces of the substrates after surface treatment of each procedure was verified by Auger surface analysis. Both groups of samples were then preoxidized at oxygen partial pressures of $10^{-4}$ mbar and $10^{-5}$ mbar at temperatures of about 2050° F. The samples were then coated with a standard 7-YSZ ceramic topcoat in the manner set forth in Example 1 and tested in accordance with the testing performed in Example 1. The acid treated group performed in accordance with the baseline samples that were single phase bond coated, being grit blasted but not having a partial pressure heat treatment. The FCT life of the acid treated group was in the range of about 230 cycles. The FCT life of the group that was grit blasted was similar to the performance of the samples in Example 1 and FIG. 2 that were grit blasted and provided with a preoxidation partial pressure heat treatment at pressures of $10^{-4}$ mbar and $10^{-5}$ mbar.

Figure 2:
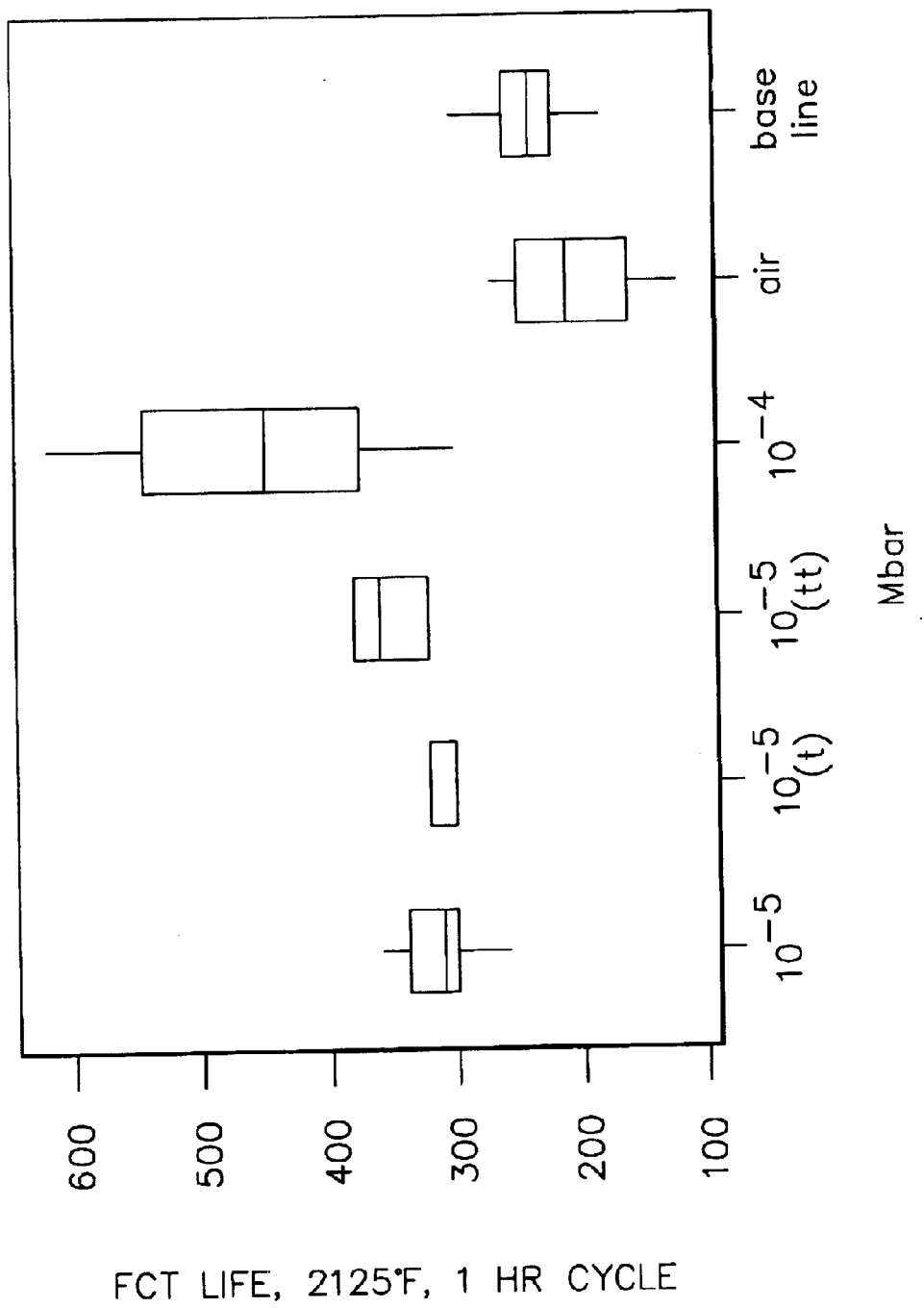
FIG. 2 is a graph showing the effects of the partial pressure of oxygen during preoxidizing treatment on the FCT life of a coating made in accordance with the present invention.

Based on the results of the above testing as provided in FIG. 2, both the pretreatment of the surface of the sample having a platinum aluminide prior to a preoxidation as well as the partial oxygen pressure of a preoxidation heat treatment are factors in FCT performance. Preoxidation heat treatment of the samples alone is insufficient to provide a beneficial effect to the samples. This is evident from the test results of Example 2, in which no beneficial effect in FCT performance from a partial pressure preoxidation heat treatment was observed in those samples that were acid etched. However, samples having a surface that was grit blasted prior to a partial pressure preoxidation heat treatment did show an improved FCT performance. The FCT performance, however, did increase to a maximum at a partial pressure of about $10^{-4}$ millibars of oxygen, and decreased as the partial pressure of oxygen was further reduced. Thus, FCT performance is influenced not only by a partial pressure heat treatment of oxygen, but also by surface treatment of the PtAl bond coat prior to the heat treatment, the rate of heating to preoxidized the surface and the temperature of the preoxidation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for coating a gas turbine component with a thermal barrier coating system by a controlled preoxidation heat treatment, comprising the steps of:

providing a gas turbine component for use at high temperatures;

applying a thin layer of platinum to at least a portion of a surface of the component;

forming a single phase platinum aluminide on the surface of the component by exposing the thin layer of platinum to a source of aluminum for a preselected time; then, producing a surface of the single phase platinum aluminide having a surface finish between about 16 microinches $R_a$ and 125 microinches $R_a$;

cleaning the single phase platinum aluminide to provide a surface free of oxides, contaminants and local gradients of nickel, aluminum and platinum; then, preoxidizing the single phase platinum aluminide by heating the component in a preselected partial pressure of oxygen, wherein the preoxidation is accomplished by heating the component to a preselected temperature at a preselected rate so as to form a thin layer of pure alumina over the single phase platinum aluminide; followed by, applying a ceramic top coat over the thin layer of pure alumina.

2. The method of claim 1 wherein the step of applying a ceramic top coat using a PVD technique over the thin layer of pure alumina by applying the ceramic top coat within a preselected temperature range includes applying a yttria-stabilized zirconia using EB-PVD.

3. A method for coating a gas turbine component with a thermal barrier coating system by a controlled preoxidation heat treatment, comprising the steps of:

providing a gas turbine component for use at high temperatures;

applying a thin layer of platinum to at least a portion of the component;

forming a single phase platinum aluminide by exposing the thin layer of platinum to a source of aluminum for a preselected time;

grit blasting the single phase platinum aluminide using a grit of preselected size at a preselected pressure for a time sufficient to achieve a surface finish of between about 32 microinches $R_a$ and 63 microinches $R_a$; then, preoxidizing the single phase platinum aluminide by heating the component in a vacuum furnace at a preselected partial pressure of oxygen, wherein the preoxidation is accomplished by heating the component to a preselected temperature at a preselected rate so as to form a thin layer of pure alumina over the single phase platinum aluminide; followed by, applying a ceramic top coat over the thin layer of pure alumina.

4. The method of claim 3 wherein the step of providing includes providing a gas turbine component comprised of a superalloy material.

5. The method of claim 5 wherein the step of providing includes providing a gas turbine component comprised of a nickel-based superalloy material.

6. The method of claim 3 wherein the step of applying a thin layer of platinum to at least a portion of the substrate includes applying a thin layer of platinum to the substrate by a chemical vapor deposition process.

7. The method of claim 3 wherein the step of applying a thin layer of platinum to at least a portion of the substrate includes applying a thin layer of platinum to the substrate by electrochemical deposition.

8. The method of claim 3 the step of forming a single phase platinum aluminide by exposing the thin layer of platinum to a source of aluminum for a preselected time includes exposing the thin layer of platinum to a source of vapor phase aluminum for sufficient time and at a sufficiently high temperature to form a single phase platinum aluminide.

9. The method of claim 3 wherein the step of grit blasting the single phase platinum aluminide using a grit of preselected size at a preselected pressure includes selecting an alumina grit having a size classification from about #60–#120.

10. The method of claim 9 wherein the step of grit blasting the single phase platinum aluminide using a grit of preselected size at a preselected pressure includes selecting an alumina grit having a size classification of about #80.

11. The method of claim 9 wherein the step of grit blasting the single phase platinum aluminide using a grit of preselected size at a preselected pressure includes selecting a pressure between about 30 psi and about 100 psi.

12. The method of claim 11 wherein the step of grit blasting the single phase platinum aluminide using a grit of preselected size at a preselected pressure further includes selecting a pressure between about 60 psi and about 80 psi.

13. The method of claim 3 wherein the step of preoxidizing the single phase platinum aluminide by heating the component in a vacuum furnace at a preselected partial pressure of oxygen, wherein the preoxidation is accomplished by heating the component to a preselected temperature at a preselected rate so as to form a thin layer of pure alumina includes heating the component in a partial pressure of oxygen between 1000 Mbar and $10^{-5}$ mbar.

14. The method of claim 13 wherein the step of preoxidizing the single phase platinum aluminide by heating the component in a vacuum furnace at a preselected partial pressure of oxygen, wherein the preoxidation is accomplished by heating the component to a preselected temperature at a preselected rate so as to form a thin layer of pure alumina further includes heating the component in a partial pressure of oxygen of about $10^{-4}$ mbar.

15. The method of claim 13 wherein the step of preoxidizing the single phase platinum aluminide by heating the component in a vacuum furnace at a preselected partial pressure of oxygen, wherein the preoxidation is accomplished by heating the component to a preselected temperature at a preselected rate so as to form a thin layer of pure alumina includes heating to a temperature in the range of about 1800° F. and 2100° F.

16. The method of claim 15 wherein the step of preoxidizing the single phase platinum aluminide by heating the component in a vacuum furnace at a preselected partial pressure of oxygen, wherein the preoxidation is accomplished by heating the component to a preselected temperature at a preselected rate so as to form a thin layer of pure alumina further includes heating to a temperature of about 2000° F.–2050° F.

17. The method of claim 15 wherein the step of preoxidizing the single phase platinum aluminide by heating the component in a vacuum furnace at a preselected partial pressure of oxygen, wherein the preoxidation is accomplished by heating the component to a preselected temperature at a preselected rate so as to form a thin layer of pure alumina includes heating from near ambient to a temperature in the range of about 2000° F.–2100° F. in no longer than 45 minutes.

18. The method of claim 15 wherein the step of preoxidizing the single phase platinum aluminide by heating the component in a vacuum furnace at a preselected partial pressure of oxygen, wherein the preoxidation is accomplished by heating the component to a preselected temperature at a preselected rate so as to form a thin layer of pure alumina further includes heating from near ambient to a temperature in the range of about 2000° F.–2100° F. in about 11 to 15 minutes.

* * * * *